United States Patent
Schmidt

(10) Patent No.: US 7,367,910 B2
(45) Date of Patent: May 6, 2008

(54) ONE-MODE INPUT-SPLIT ELECTRO-MECHANICAL TRANSMISSION WITH TWO FIXED SPEED RATIOS

(75) Inventor: Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 212 days.

(21) Appl. No.: 11/232,705

(22) Filed: Sep. 22, 2005

(65) Prior Publication Data

US 2007/0066432 A1 Mar. 22, 2007

(51) Int. Cl.
*F16H 3/72* (2006.01)
*F16H 3/44* (2006.01)

(52) U.S. Cl. .............. 475/5; 475/317; 475/320

(58) Field of Classification Search .............. 475/5, 475/311, 317, 323, 314, 320; 477/5
See application file for complete search history.

(56) References Cited

U.S. PATENT DOCUMENTS

| | | | |
|---|---|---|---|
| 3,566,717 A | 3/1971 | Berman et al. | |
| 5,087,230 A * | 2/1992 | Yates et al. | 475/151 |
| 5,558,595 A | 9/1996 | Schmidt et al. | |
| 5,643,119 A | 7/1997 | Yamaguchi et al. | |
| 6,146,302 A * | 11/2000 | Kashiwase | 475/5 |
| 6,251,037 B1 * | 6/2001 | Baumgaertner et al. | 475/2 |
| 6,371,878 B1 * | 4/2002 | Bowen | 475/5 |
| 7,175,555 B2 * | 2/2007 | Kozarekar et al. | 475/5 |
| 7,192,373 B2 * | 3/2007 | Bucknor et al. | 475/5 |
| 7,226,385 B2 * | 6/2007 | Tabata et al. | 477/5 |
| 2007/0149334 A1* | 6/2007 | Holmes et al. | 475/5 |

\* cited by examiner

*Primary Examiner*—Roger Pang

(57) ABSTRACT

A one-mode, input-split electrically variable transmission is provided with two motor/generators and a torque-transmitting mechanism that is operatively connected to a second member of a first differential gear set and selectively engageable to connect the second member of the first differential gear set with the stationary member, thereby establishing a fixed speed ratio between the input member and the output member of the transmission. Preferably, another torque-transmitting mechanism is also provided to lock any two members of the differential gear set to one another, thereby establishing a second fixed speed ratio between the input member and the output member.

16 Claims, 4 Drawing Sheets

ONE-MODE INPUT-SPLIT ELECTRO-MECHANICAL TRANSMISSION WITH TWO FIXED SPEED RATIOS

TECHNICAL FIELD

The present invention relates to electrically variable transmissions with selective operation both in power split variable speed ratio ranges and two fixed speed ratios. The transmission has two motor/generators and two torque-transmitting mechanisms, provides a single mode and input-split.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. Other forms of differential gearing include bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the one-mode input-split electrically variable transmission disclosed in U.S. Pat. No. 5,558,595, issued Sep. 24, 1996, to Michael Roland Schmidt, commonly assigned with the present application, and hereby incorporated by reference in its entirety. Such a transmission utilizes an input member to receive power from a vehicle power source such as an internal combustion engine, and a power output means such as an output member to deliver power to drive the vehicle. First and second motor/generators are connected to an energy storage device, such as a battery, so that the energy storage device can accept power from, and supply power to, the first and second motor/generators. The control unit regulates power flow among the energy storage device and the motor/generators as well as between the first and second motor/generators. In typical one-mode, input-split hybrid transmissions, fixed ratios may not be provided and electrical power must be circulated through both of the motor/ generators, with the motor/generators acting either as motors or generators in order for power to be delivered at the output member to drive the vehicle.

SUMMARY OF THE INVENTION

An adaptation of a one-mode, input-split electro-mechanical transmission is provided that enables maximum fuel economy to be achieved at a reasonable cost. Particularly, the transmission utilizes a torque-transmitting mechanism, which may be referred to as a lock-up clutch, that establishes fixed ratio operation during cruising by forcing the engine to operate at a slow speed while maintaining a high vehicle speed, for instance on a low road slope or grade. This lock-up cruise clutch will be referred to herein as the C2 clutch or first torque-transmitting mechanism. Preferably, a second torque-transmitting mechanism or lock-up clutch is also provided that, when engaged, allows a second fixed speed ratio between the transmission input member and output member. The second lock-up clutch will be referred to herein as the C1 clutch. The C1 clutch is appropriately engaged when acceleration and full engine power is needed. A "fixed speed ratio" is an operating condition in which the mechanical power input to the transmission is transmitted mechanically to the output member, and no power flow is necessary in the motor/generators. An electrically variable transmission that may selectively achieve fixed speed ratios for operation near full engine power can be smaller and lighter for a given maximum capacity. Fixed ratio operation may also result in lower fuel consumption when operating under conditions where engine speeds can approach its optimum without using the motor/generators. A variety of fixed speed ratios and variable ratio spreads can be realized by suitably selecting the tooth ratios of the differential gear sets or gear members in a transmission.

With engagement of either the C1 or C2 clutches, the transmission operates to provide a fixed speed ratio and electrical power need not be circulated through either the first or the second motor/generator to provide rotation at the output member. However, if desired, electrical power may be utilized in the motor/generators, as more fully described below, to supplement engine power.

Specifically, an electro-mechanical transmission is provided having an input member to receive power from a power source, such as an internal combustion engine, and also having an output member. First and second motor/generators are provided as well as a first differential gear set having first, second and third members. Preferably, the first differential gear set is a planetary gear set, but other gear arrangements may be implemented, such as beveled gears or differential gearing to an offset axis. The first, second or third member of each planetary gear set may be any one of a sun gear member, a ring gear member or a carrier member on which a plurality of pinion gears rotate. The pinion gears meshingly engage the sun gear member and the ring gear member. The input member is continuously operatively connected to the first member of the first differential gear set. The first motor/generator is continuously operatively connected to the second member of the first differential gear set to establish an input-split power flow. The third member of the first differential gear set is continuously operatively connected to the second motor/generator and to the output member such that the transmission is characterized by a single mode of operation. As used herein, a "single mode" or "one mode" means that only one particular connecting scheme results in operation in a continuously variable range of speed ratios. The first torque-transmitting mechanism (i.e., C2) is operatively connected to the second member of the first differential gear set. The C2 clutch is selectively engageable to connect the second member of the first differential gear set with the stationary member, thereby establishing a first fixed speed ratio between the input member and the output member.

The second torque-transmitting mechanism (i.e., the C1 clutch) is selectively engageable to connect any two members of the first planetary gear set with one another. Preferably, the C1 clutch connects the second member of the first planetary gear set with the third member of the first planetary gear set. Engagement of the C1 clutch locks all members of the first planetary gear set at the speed of the input member to establish a second fixed speed ratio between the input member and the output member. The C1 and C2 clutches are not engaged at the same time.

In one aspect of the invention, the first differential gear set is a planetary gear set and the first member of the first differential gear set is a carrier member, the second member of the first differential gear set is a ring gear member and a third member of the first differential gear set is a sun gear member.

In another aspect of the invention, an intermediate shaft is operatively connected with the output member. The third member of the first differential gear set and the second motor/generator are connected to the intermediate shaft for common rotation therewith.

In another aspect of the invention, a set of intermeshing gears includes a first intermeshing gear continuously interconnected with the first motor/generator for common rotation therewith and a second intermeshing gear continuously operatively connected to the second member of the first differential gear set via a first interconnecting member and continuously intermeshing with the first intermeshing gear.

In one aspect of the invention, input member and a second motor/generator are aligned to rotate about a first access of rotation. A first countershaft offset from the first axis of rotation may be provided with the first motor/generator rotating about the first countershaft. Alternatively, the input member and the output member may be aligned to form a common axis of rotation and both the first and second motor/generators may be concentrically disposed about the common axis of rotation. In the latter instance, the first set of intermeshing gears described above may be a second differential gear set such as a planetary gear set having a ring gear member circumscribing a sun gear member and a plurality of pinion gear members rotatably supported on a carrier member and intermeshing with both the ring gear member and the sun gear member. The first intermeshing gear is the ring gear member and the second intermeshing gear is one of the pinion gear members. The carrier member is continuously interconnected with the second member of the first planetary gear set and the sun gear member is continuously connected to the stationary member.

In yet another aspect of the invention, another set of intermeshing gears may be provided having an intermeshing gear operatively connected with the second motor/generator and with the third member of the first differential gear set via another interconnecting member. This intermeshing gear intermeshes with another intermeshing gear to thereby transfer torque to the output member. In the embodiment described above wherein the input member and output member are coaxially aligned and the first and second motor/generators are concentric about an axis of rotation formed by the input and output members, this latter set of intermeshing gears may be a differential gear set such as a planetary gear set. In that case, the first intermeshing gear is a sun gear member and the second intermeshing gear is one of the pinion gear members and the carrier member is continuously connected with the output member. The ring gear member is continuously connected with the stationary member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
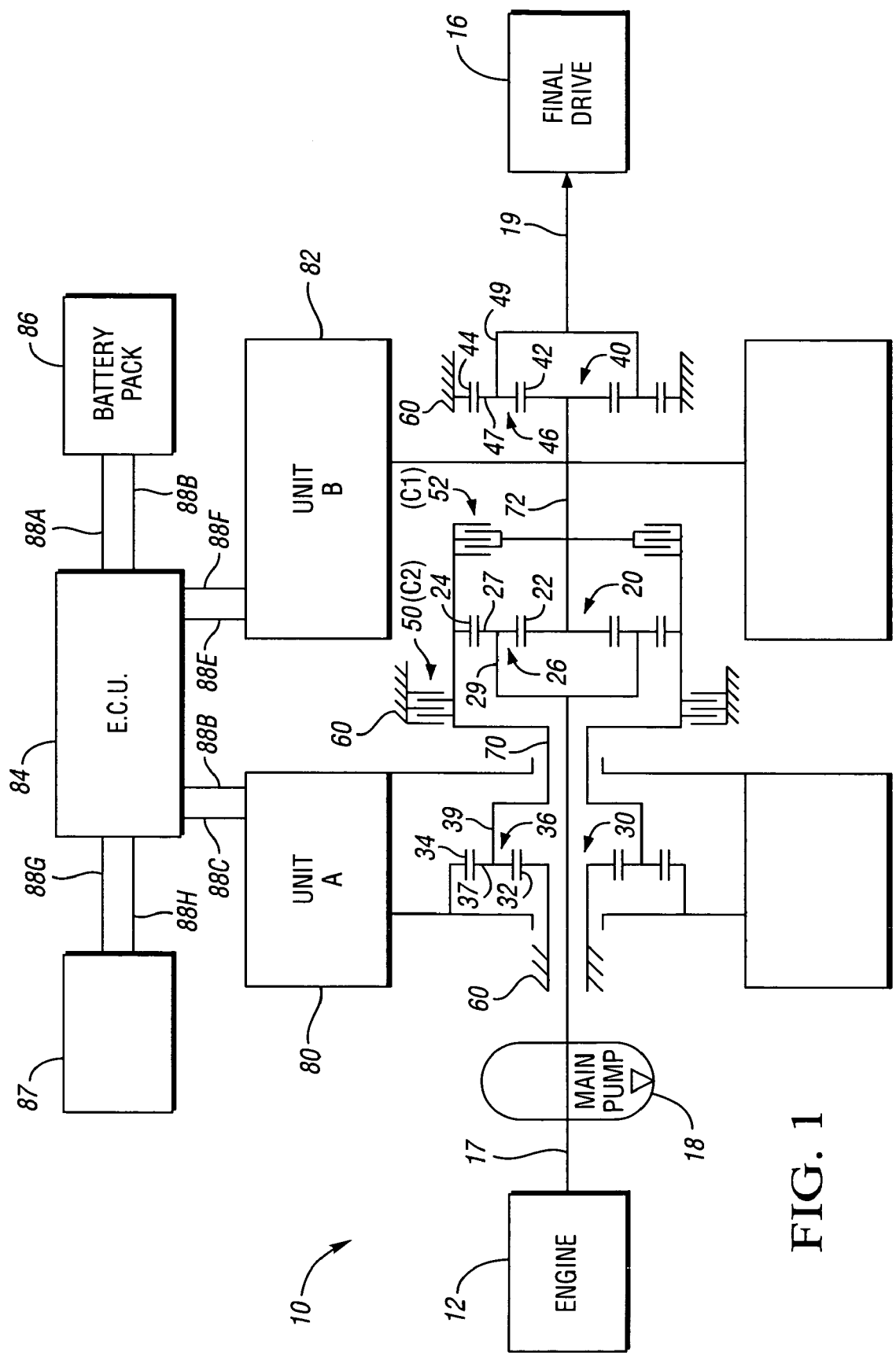
FIG. 1 is a schematic representation of a one-mode, input-split electro-mechanical transmission embodying the concepts of the present invention.

One representative form of a one-mode, input-split electro-mechanical transmission embodying the concepts of the present invention is depicted in FIG. 1, and is designated generally by the numeral 10. The hybrid transmission 10 has an input member 17 that may be in the nature of a shaft which may be directly driven by an engine 12. The engine 12 may be a fossil fuel engine, such as an internal combustion engine or a diesel engine, which is readily adapted to provide its available power output delivered at a constant number of revolutions per minute (rpm). A pump 18 may be driven off of the input member 17 for providing lubrication and cooling fluid throughout the transmission 10. Power flows from the input member 17 through the transmission 10 as will be described below to be delivered at an output member 19 for powering a final drive 16.

The transmission 10 includes a first planetary gear set 20 that includes a sun gear member 22, a ring gear member 24 circumscribing the sun gear member 22 and a planet carrier assembly member 26 including a plurality of pinion gears 27 (also referred to herein as pinion gear members) rotatably mounted on a carrier member 29 and meshingly engaging with both the ring gear member 24 and the sun gear member 22. The input member 17 is continuously connected with the carrier member 29 for providing power thereto.

The transmission 10 further includes a second planetary gear set 30 including a sun gear member 32, a ring gear member 34 circumscribing the sun gear member 32 and a planet carrier assembly member 36 including a plurality of pinion gears 37 rotatably supported on a carrier member 39 and meshing engaging both the ring gear member 34 and the sun gear member 32. The carrier member 39 is continuously connected with the ring gear member 24 via an interconnecting member 70 which is a rotatable sleeve shaft.

Furthermore, the transmission 10 includes a third planetary gear set 40 including a sun gear member 42, a ring gear member 44 circumscribing the sun gear member 42 and a planet carrier assembly member 46 including a plurality of pinion gears 47 rotatably mounted on a carrier member 49 and meshingly engaging with both the ring gear member 44 and the sun gear member 42. The sun gear member 22 is continuously connected with the sun gear member 42 via an interconnecting member 72 which is an intermediate shaft. The sun gear member 42 and pinion gear members 47 may also be referred to as intermeshing gears with the carrier member that supports the pinion gear members being continuously connected with the output member 19. The ring gear member 44 and the sun gear member 32 are continuously connected to a stationary member which is the transmission housing 60.

The input member 17 and output member 19 are aligned to form an axis of rotation therethrough, running along the lines schematically depicting the input member 17 and the output member 19 in FIG. 1. First and second motor/generators 80, 82 (respectively referred to herein as Unit A and Unit B) are concentrically disposed about the common axis of rotation formed by the input member 17 and output member 19 for rotation thereabout. As will be well understood by those skilled in the art, each of the motor/generators 80, 82 includes a stator secured to a stationary member such as the transmission housing 60 as well as a rotatable rotor. The rotor of the first motor/generator 80 is secured to the ring gear member 34 for common rotation therewith. The rotor of the second motor/generator 82 is secured to the intermediate shaft 72 for rotation therewith.

As should be apparent from the foregoing description, the transmission 10 selectively receives power from the engine 12. The transmission 10 also receives power from an electric storage device 86 such as a battery pack. Other electric storage devices that have the ability to store electric power and dispense electric power may be used in place of the battery pack without altering the concepts of the present invention. The battery pack may include one or more batteries. The horsepower output of the electric storage device 86 is not critical to the invention, but for the purpose of affecting a clear understanding of the hybrid transmission 10, an output power of about 54 (hp) from the electrical storage device 86 will be assumed for description of the transmission 10. The electrical storage device 86 will be sized depending on regenerative requirements, regional issues such as grade and temperature, and other requirements such as emissions, power assist and electric range.

The electric storage device 86 communicates with an electrical control unit (ECU) 84 by transfer conductors 88A and 88B. The ECU 84 communicates with the first motor/generator 80 by transfer conductors 88C and 88D and similarly communicates with the second motor/generator 82 by transfer conductors 88E and 88F. Additionally, the ECU 84 communicates with other vehicle electrical components 87, such as electric power steering and electrical power braking systems, etc. The ECU 84 communicates with these vehicle electrical components via transfer conductors 88G and 88H. Preferably, the maximum electrical power requirements of the other electrical components 87 is such that no more than 2 (hp) is required to power these components.

The ECU 84 responds to a variety of input signals including vehicle speed, operator demand, the level to which the electric storage device 86 is charged and the power being applied by the engine 12, to regulate the flow of power between the motor/generators 80 and 82 and the electric storage device 86. The ECU 84 can manipulate each motor/generator 80 and 82 to act as either a motor or a generator. The ECU 84 also regulates the flow of power into and out of the electric storage device 86.

The input member 17 is continuously connected to the carrier member 29 of the first planetary gear set 20 for establishing the engine 12 to power the carrier member 29 by causing it to rotate in the same direction as the input member 17. As discussed above, the ring gear member 24 is continuously connected with the carrier member 39 through the interconnecting member 70. The ring gear member 34 is continuously connected to the first motor/generator 80. Thus, when the first motor/generator 80 acts as a motor, it drives the ring gear member 34. Alternatively, if the motor/generator 80 is controlled by the ECU 84 to act as a generator, the rotation of the ring gear member 34 powers the first motor/generator 80. The power and speed applied to the ring gear member 24 is thus affected by the motor or generator status of the first motor/generator 80. In either case, power is split through the first planetary gear set 20, being provided both from the engine 12 and from the first motor/generator 80 or to the first motor/generator 80, thereby affecting the speed and power supplied to the intermediate shaft 72. Notably, the second motor/generator 82 is continuously connected with the intermediate shaft 72 and may be controlled by the ECU 84 to act as a motor, thereby providing power and driving the intermediate shaft 72 or to act as a generator thereby being driven by rotation of the intermediate shaft 72. Finally, power flows through the planetary gear set 40 to the output member 19.

If the first torque-transmitting mechanism 50 (the C2 lock-up clutch) is engaged, the carrier member 39 is grounded to the transmission housing 60. Thus, with both the sun gear member 32 and the carrier member 39 held stationary, the entire planetary gear set 30 is stationary and the first motor/generator 80 does not affect power flow through the transmission 10. The ring gear member 24 is also grounded to the stationary member 60 via application of the C2 lock-up clutch 50. Thus, the ring gear member 24 acts as a reaction member in permitting power flow from the input member 17 through the planetary gear set 20 via the carrier member 29 to the intermediate shaft 72. Rotation of the intermediate shaft 72 powers the sun gear member 42 which in turn drives the carrier member 49 and the output member 19 to power the final drive 16. Notably, if the second motor/generator 82 is not powered (i.e., no electrical flow is provided therethrough by the ECU 84), the speed ratio of the output member 19 to the input member 17 is fixed and is entirely mechanical, dependant only upon the ring gear/sun gear tooth ratios of the planetary gear sets 20 and 40. Alternatively, the ECU 84 may control the second motor/generator 82 to act as a generator during application of the C2 lock-up clutch 50 to recharge the energy storage device 86 or as a motor to add power to intermediate shaft 72.

Figure 2:
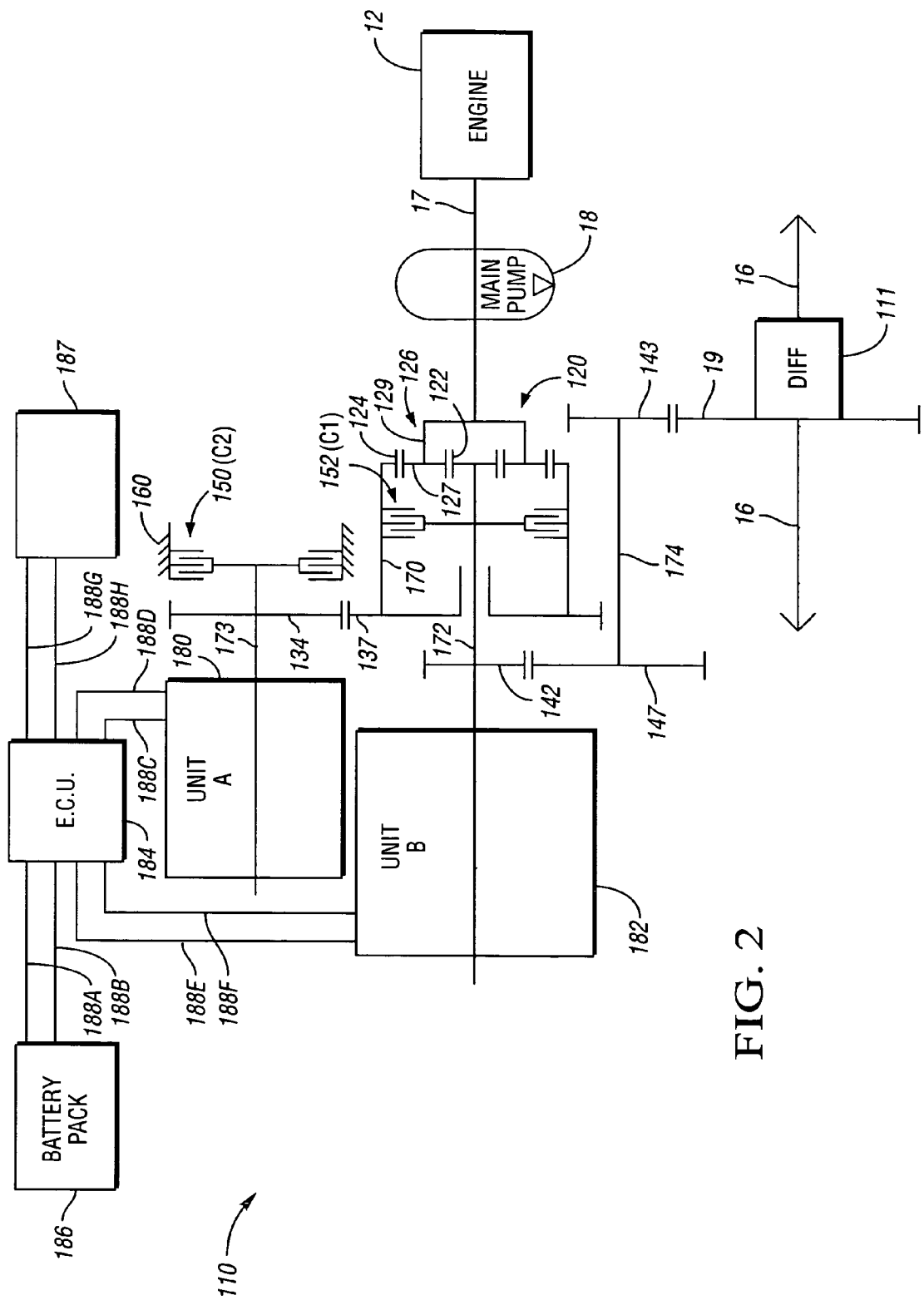
FIG. 2 is a schematic representation of another embodiment of a one-mode input-split electro-mechanical transmission embodying the concepts of the present invention.

Referring now to FIG. 2, an alternative embodiment of an electro-mechanical transmission 110 within the scope of the invention is depicted. Power flows from the engine 12 through the input member 17 to the output member 19 and final drive 16 as will be described below. The transmission 110 includes a first planetary gear set 120 having a sun gear member 122, a ring gear member 124 circumscribing the sun gear member 122, and a planet carrier assembly member 126 including a carrier member 129 which rotatably supports a plurality of pinion gear members 127 which intermesh with both the ring gear member 124 and the sun gear member 122. The carrier member 129 is continuously connected with the input member 17. A first set of intermeshing gears includes a first intermeshing gear 134 which intermeshes with a second intermeshing gear 137. The second intermeshing gear 137 is continuously connected with the ring gear member 124 via an interconnecting member 170. A first motor/generator 180 is continuously connected with the first intermeshing gear 134 for common rotation therewith via a first countershaft 173. A second set of intermeshing gears includes intermeshing gear 142 which is continuously connected with the interconnecting member 172 for common rotation therewith. A gear 142 intermeshes with another gear 147. A second motor/generator 182 is continuously connected with the intermediate shaft 172 and the gear 142 for common rotation therewith.

Notably, the input member 17 and the intermediate shaft 172 are coaxially aligned to form a first axis of rotation about which the second motor/generator 182 rotates. The first motor/generator 180 is offset from the common axis of rotation and rotates about the first countershaft 173 to which the gear 134 is continuously connected for common rotation. Additionally, the gear 147 is connected for common rotation with a second countershaft 174 which also has a gear member 143 connected for common rotation thereto. The gear member 143 intermeshes with the output member 19 to provide power thereto.

An electronic control unit (ECU) 184 is connected to both the first and second motor/generator 180, 182, respectively, as well as to an energy storage device 186 (also referred to herein as a battery pack) which may include one or more batteries. The ECU 184 responds to a variety of input signals, as described above with respect to the ECU 84, to regulate the flow of power between the motor/generators 80, 82 and the energy storage device 186. Other vehicle electrical components 187 are also controlled by the ECU 184 to allow power to be provided thereto from the energy storage device 186. The ECU communicates with the energy storage device 186 via transfer conductors 188A and 188B. The ECU 184 communicates with the first motor/generator 180 via transfer conductors 188C and 188C. The ECU 184 communicates with the second motor/generator 182 via transfer conductors 188E and 188F. The ECU also communicates with the other electrical components 187 via the transfer conductors 188G and 188H.

Driving power is delivered from the engine 12 to the input member 17 which in turn provides power to the carrier member 129. Power is then transferred through the first planetary gear set 120 via the intermediate shaft 172 and transferred through the intermeshing gears 142 and 147 to the countershaft 174 before being delivered to the output member 19 via the gear member 143. A differential member 111 is disposed between the output member 19 and the final drive 16, as is appropriate in a front wheel drive arrangement.

The first motor/generator 180 is selectively controlled by the ECU 184 to act as a motor by driving the gear member 134, thus supplementing power provided by the engine 12 to the planetary gear set 120 by delivering power through intermeshing gears 134 and 137 to the ring gear member 124. Alternatively, the first motor/generator 180 may be controlled by the ECU 184 to act as a generator in which it is driven by the gear member 134. Likewise, the second motor/generator 182 may be controlled by the ECU 184 to act as a motor in which case it drives the gear member 142 in conjunction with power provided through the planetary gear set 120 by the engine 12. Alternatively, the second motor/generator 182 may be controlled by the ECU 184 to act as a generator, in which case it is driven by the gear member 142.

Application of the C2 lock-up clutch 150 grounds the countershaft 173, the gear member 134 and the first motor/generator 180 to the transmission housing 160. The gear member 137 and the ring gear member 124 are also grounded during application of the C2 lock-up clutch 150. Thus, the ring gear member 124 serves as a reaction member as power is provided from the engine 12 through the planetary gear set 120. A fixed forward speed ratio will be achieved at the output member 19 during application of the C2 lock-up clutch 150. The second motor/generator 182 may be controlled to act as a motor, to supplement engine power, or as a generator during application of the C2 lock-up clutch 150.

If the C1 lock-up clutch 152 is engaged rather than the C2 lock-up clutch, the ring gear member 124 is connected for common rotation with the sun gear member 122, thereby causing the entire first planetary gear set 120, the gear member 142 as well as gear member 137 to rotate at the speed of the input member 17. Thus, a second fixed forward speed ratio will be achieved through the intermeshing gear members 142 and 147 and 143 to the output member 19. Either or both of the first and second motor/generator 180, 182 may be controlled to act as motors or generators during application of the C1 lock-up clutch 152. Thus, during application of either the C1 or C2 lock-up clutch 152, 152, respectively, the motor/generators 180, 182 may function as motors or generators, however they are completely independent of engine 12 to output member 19 power flow, thereby enabling both to be motors, both to function as generators or any combination thereof.

Figure 3:
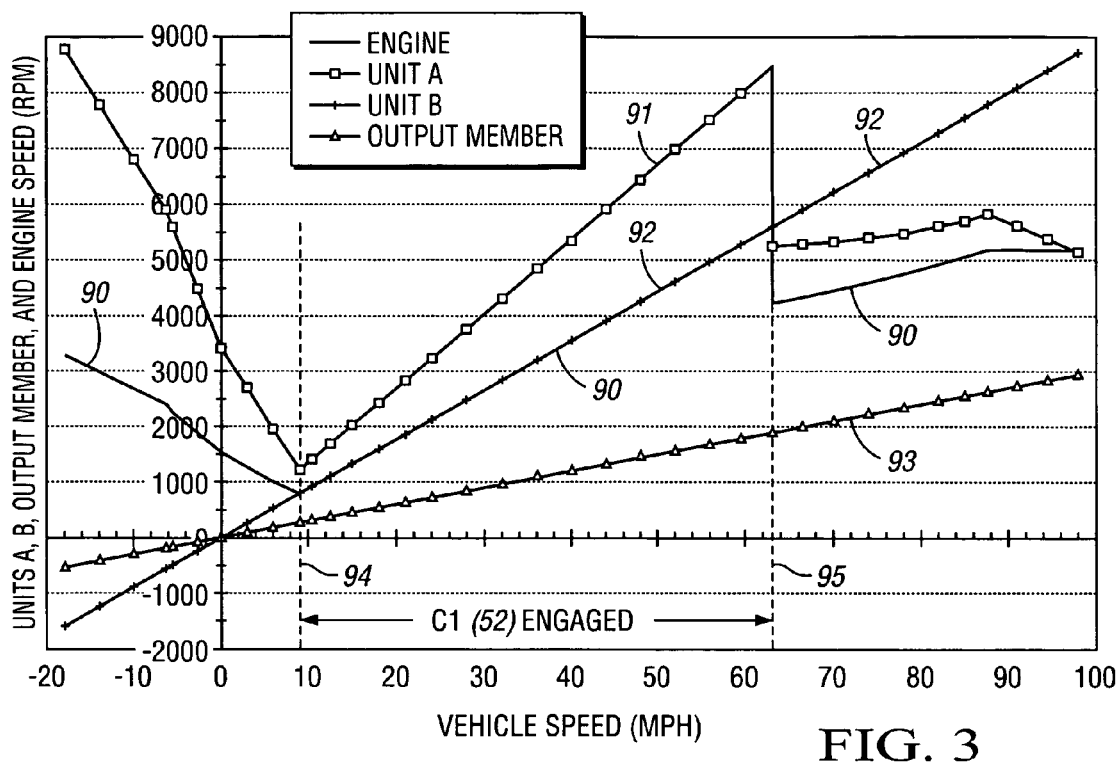
FIG. 3 is a graphical representation of the rotations per minute (rpm) of each motor/generator as well as the engine and the output member relative to the speed of the vehicle in miles per hour (mph), illustrating these characteristics during engagement of the C1 lock-up clutch.

Turning now to FIG. 3, the speed of the engine 12 in revolutions per minute (rpm) versus vehicle speed in miles per hour (mph) is illustrated by curve 90. FIGS. 3-6 describe characteristics of both the embodiment of FIG. 1 and the embodiment of FIG. 2. Reference numbers for the components of the embodiment of FIG. 1 will be used in discussing FIGS. 3-6, although like component numbers for the embodiment of FIG. 2 apply equally as well. Curve 91 illustrates the speed of the first motor/generator 80 (Unit A) versus vehicle speed and curve 92 illustrates the speed of the second motor/generator 82 (Unit B) versus vehicle speed. Finally, the speed of the output member (rpm) versus vehicle speed (mph) is illustrated by curve 93. The range of vehicle speeds between the vertical plot lines 94 and 95 illustrates the speeds at which the C1 lock-up clutch 52 is engaged. Thus, from about nine miles per hour (line 94) to 63 miles per hour (line 95), the C1 lock-up clutch 52 is engaged. In the chart of FIG. 3, the ECU 84 controls the first motor/generator 80 to act as a motor during application of the C1 lock-up clutch 52, as is evident from the increasing speed of the first motor/generator 80 in relation to increasing vehicle speed as shown by curve 91. Prior to application of the C1 lock-up clutch 52 (i.e., to the left of the vertical line 94), the first motor/generator 80 is controlled to act as a generator. Also, after disengagement of the C1 lock-up clutch (i.e., to the right of the vertical line 95), (i.e., after a period of high vehicle acceleration and transient pull is required), the first motor/generator 80 is controlled to act as a generator.

Referring to the speed of the second motor/generator 82 (Unit B) versus vehicle speed, it is evident from the curve 92 that the second motor/generator 82 acts as a motor throughout the vehicle speed range depicted. The speed of the output member 19 shown by curve 93 increases at a constant rate through the range of vehicle speeds depicted.

Referring to the characteristics of the engine, the speed of which is shown by curve 90, engine speed initially drops prior to engagement of the C1 lock-up clutch 52. Upon engagement of the C1 lock-up clutch 52 (i.e., where the curve 90 intersects the vertical line 94), the engine speed increases with increasing vehicle speed until disengagement of the C1 lock-up clutch 52 at vertical line 95, at which point the engine speed initially drops and then begins a slow increase. Notably, during engagement of the C1 lock-up clutch 52, the engine speed 90 is the same as the speed of the second motor/generator 82. For example, with respect to the embodiment of FIG. 1, when the C1 lock-up clutch 52 is applied, the ring gear member 24 is continuously connected with the sun gear member 22 which requires that all members of planetary gear set 20 rotate at the same speed. Because the carrier member 29 is continuously connected with the input member 17, the planetary gear set 20 rotates at engine speed (speed of the input member 17). Accordingly, the intermediate shaft 72 and Unit B 82 also rotate at engine speed during engagement of the C1 lock-up clutch 52, as shown in FIG. 3.

Figure 4:
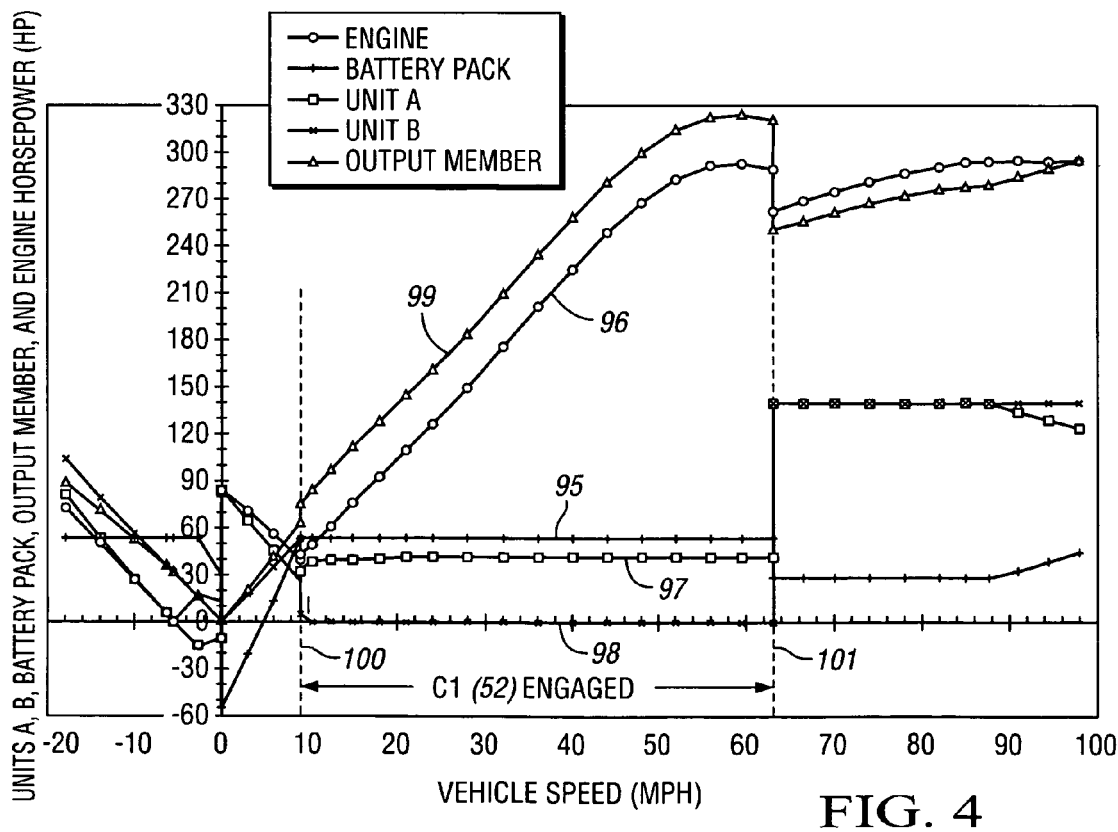
FIG. 4 is a graphical representation of horse power (hp) of each motor/generator, the engine, the battery and the output member relative to the speed of the vehicle in miles per hour (mph), illustrating these characteristics during transient pull conditions and engagement of the C1 lock-up clutch.

FIG. 4 depicts the power supplied by each of the engine 12, the first and second motor/generators 80, 82, the energy storage device 86 (battery pack) and the output member 19 to achieve the speeds depicted in FIG. 3. The power supplied by the energy storage device 86 (battery pack) is depicted by curve 95. The power supplied by the engine 12 is depicted by curve 96, the power supplied by the first motor/generator 80 is depicted by curve 97, the power supplied by the second motor/generator 82 is depicted by curve 98, and the power supplied at the transmission output member 19 is depicted by curve 99. The range of vehicle speed during which the C1 lock-up clutch 52 is engaged are those between the vertical lines 100 and 101. As is evident from FIG. 4, during engagement of the C1 lock-up clutch 52, the engine 12 supplies increasing power due to operator input, such as depression of an accelerator pedal to enable the vehicle to accelerate during towing, passing, etc. The power supplied at the output member 19 depicted by curve 99 is boosted during engagement of the C1 lock-up clutch 52. During this range of speeds, the first motor/generator 80 is provided with a relatively low amount of power to act as a motor, as illustrated by curve 97. The second motor/generator 82 is not provided with power from the energy storage device 86 by the ECU 84 during engagement of the C1 lock-up clutch 52, as illustrated by curve 98. During engagement of the C1 lock-up clutch 52, it is evident from FIG. 4 that engine power primarily is responsible for providing the high output power required during this acceleration event.

Figure 5:
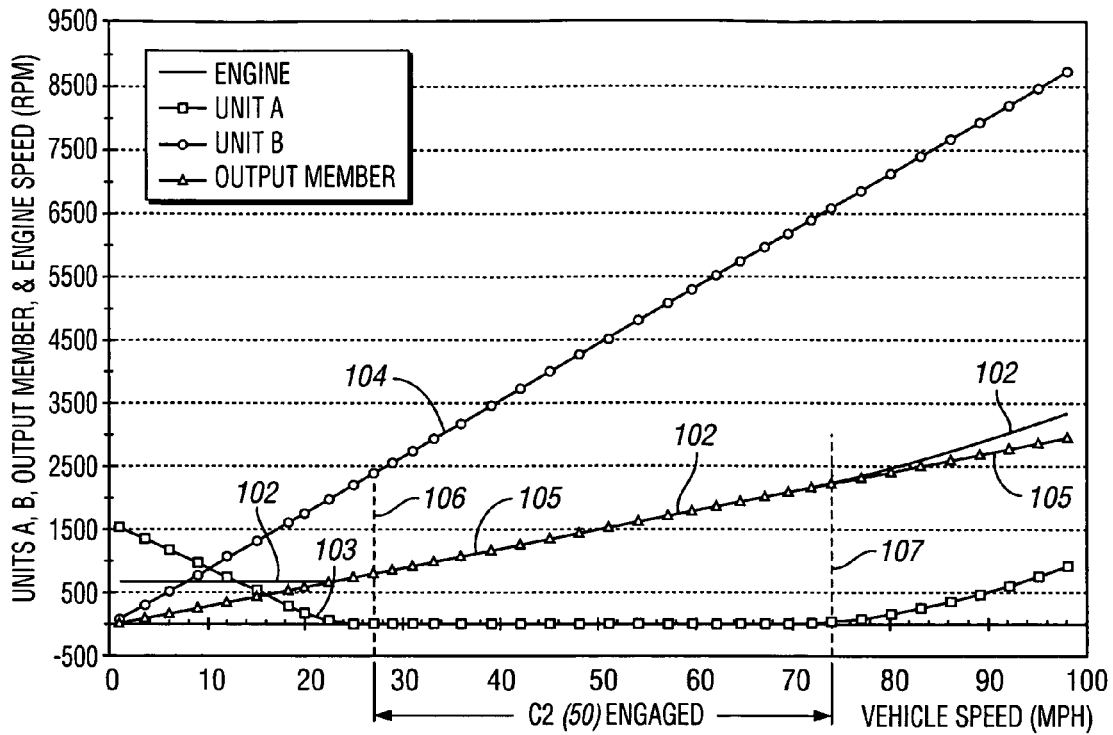
FIG. 5 is a graphical representation of rotations per minute (rpm) of each motor/generator, the engine and the output member relative to the speed of the vehicle in miles per hour (mph), illustrating these characteristics during engagement of the C2 lock-up clutch.

Referring now to FIG. 5, operating speeds of the engine 12, the first and second motor/generators 80, 82 and the output member 19 in revolutions per minute (rpm) are depicted versus vehicle speed in miles per hour (mph). The speed of the engine 12 is represented by curve 102, the speed of the first motor/generator 80 is represented by curve 103, the speed of the second motor/generator 82 is represented by curve 104 and the speed of the output member 19 is represented by curve 105. The vertical lines 106 and 107 designate the range of vehicle speeds therebetween during which the C2 lock-up clutch 50 is engaged. This range is approximately from 33 (mph) to 72 (mph). The C2 lock-up clutch 50 is designed to be engaged during vehicle cruising and forces the engine 12 to operate at a relatively slow speed while maintaining a relatively high vehicle speed. As depicted in FIG. 5, during application of the C2 lock-up clutch 50, engine speed 102 is the same as output member speed 105. This is possible because the speed of the first motor/generator 80 depicted at 103 is held to zero during application of the C2 lock-up clutch 50, and the second motor/generator 82 is controlled to function as a generator.

Figure 6:
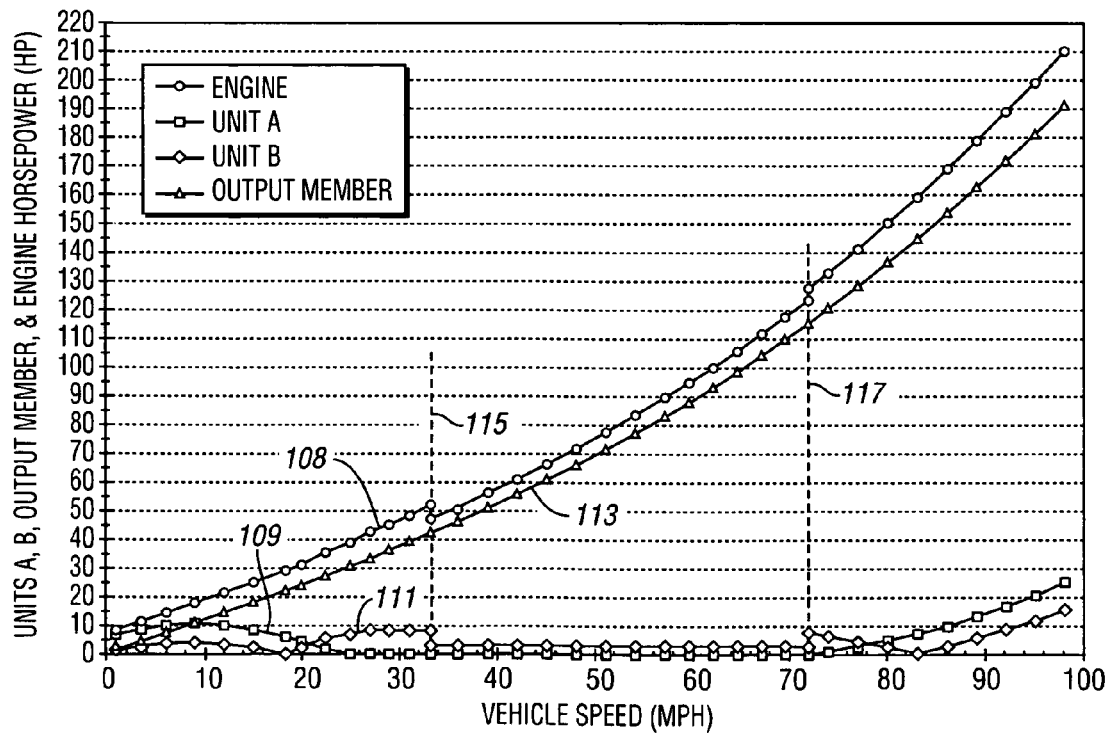
FIG. 6 is a graphical representation of horse power (hp) of each motor/generator, the engine and the output member relative to the speed of the vehicle in miles per hour (mph), illustrating these characteristics during continuous cruise conditions and engagement of the C2 lock-up clutch.

Referring now to FIG. 6, during application of the C2 clutch (the range of vehicle speeds between the vertical lines 115 and 117) power provided by the engine (depicted by curve 108) to enable steadily increasing output member power (depicted at curve 113) is slightly decreased while no power is provided through Unit A 80 (curve 109) and a relatively low amount of power is provided through Unit B 82 (curve 111), the second motor/generator 82, which as discussed with respect to FIG. 5 is controlled to act as a generator.

Notably, during application of either the C1 lock-up clutch 52 or the C2 lock-up clutch 50, a fixed speed ratio will result between the output member 19 and the input member 17 and the output member 19.

While the best modes for carrying out the invention have been described in detail, those familiar with the art to which this invention relates will recognize various alternative designs and embodiments for practicing the invention within the scope of the appended claims.

The invention claimed is:

1. An electro-mechanical transmission comprising:
   an input member to receive power from a power source;
   an output member;
   first and second motor/generators;
   a first differential gear set having first, second and third members;
   said input member being continuously operatively connected to said first member of said first differential gear set;
   said first motor/generator being continuously operatively connected to said second member of said first differential gear set to establish an input-split power flow;
   said third member of said first differential gear set being continuously operatively connected to said second motor/generator and to said output member such that said transmission is characterized by a single mode providing a continuously variable range of speed ratios;
   a first torque-transmitting mechanism operatively connected to said second member of said first differential gear set and selectively engageable to connect said second member of said first differential gear set with a stationary member, thereby establishing a first fixed speed ratio between said input member and said output member a first interconnecting member;
   a first interconnecting member; and
   a set of intermeshing gears including a first and a second intermeshing gear, said first intermeshing gear being continuously interconnected with said first motor/generator for common rotation therewith, said second intermeshing gear being continuously operatively connected with said second member of said first planetary gear set via said first interconnecting member and continuously intermeshing with said first intermeshing gear.

2. The electro-mechanical transmission of claim 1, further comprising:
   a second torque-transmitting mechanism selectively engageable to connect two of said members of said first differential gear set, thereby locking said first differential gear set at a speed of said input member to establish a second fixed speed ratio between said input member and said output member.

3. The electro-mechanical transmission of claim 1, further comprising:
   an intermediate shaft operatively connected with said output member;
   said third member of said first differential gear set and said second motor/generator being connected to said intermediate shaft for common rotation therewith.

4. The electro-mechanical transmission of claim 1, wherein said first differential gear set is a planetary gear set having a ring gear member circumscribing a sun gear member and a plurality of pinion gear members rotatably supported on a carrier member and intermeshing with both said ring gear member and said sun gear member.

5. The electro-mechanical transmission of claim 4, wherein said first member of said first differential gear set is said carrier member, said second member of said first differential gear set is said ring gear member and said third member of said first differential gear set is said sun gear member.

6. The electro-mechanical transmission of claim 1, wherein said set of intermeshing gears is a second differential gear set, said second differential gear set being a planetary gear set having a ring gear member circumscribing a sun gear member and a plurality of pinion gear members rotatably supported on a carrier member and intermeshing with both said ring gear member and said sun gear member;
   wherein said first intermeshing gear is said ring gear member, said second intermeshing gear is one of said pinion gear members, said carrier member is continuously interconnected with said second member of said first planetary gear set; and
   wherein said sun gear member is continuously connected to said stationary member.

7. The electro-mechanical transmission of claim 1, wherein said input member and said output member are aligned to form a common axis of rotation and wherein both said first and second motor/generators are concentrically disposed about said common axis of rotation.

8. The electro-mechanical transmission of claim 1, wherein said input member and said second motor/generator are aligned to rotate about a first axis of rotation; said electro-mechanical transmission further comprising:
   a first countershaft offset from said first axis of rotation; wherein said first motor/generator rotates about said first countershaft.

9. The electro-mechanical transmission of claim 1, further comprising:
   an interconnecting member;
   a set of intermeshing gears including a first and a second intermeshing gear, said first intermeshing gear being continuously interconnected with said second motor/generator and with said third member of said first differential gear set via said interconnecting member and intermeshing with said second intermeshing gear to thereby transfer torque to said output member.

10. The electro-mechanical transmission of claim 9, wherein said set of intermeshing gears is a second differential gear set, said second differential gear set being a planetary gear set having a ring gear member circumscribing a sun gear member and a plurality of pinion gear members rotatably supported on a carrier member and intermeshing with both said ring gear member and said sun gear member;
wherein said first intermeshing gear is said sun gear member;
wherein said second intermeshing gear is one of said pinion gear members;
wherein said carrier member is continuously connected with said output member; and
wherein said ring gear is continuously connected with said stationary member.

11. An electro-mechanical transmission comprising:
an input member to receive power from a power source;
an output member;
first and second motor/generators;
a first differential gear set having first, second and third members;
said input member being continuously operatively connected to said first member of said first differential gear set;
said first motor/generator being continuously operatively connected to said second member of said first differential gear set to establish an input-split power flow;
said second motor/generator being continuously operatively connected to said third member of said first differential gear set and to said output member such that said transmission is characterized by a single mode providing a continuously variable range of speed ratios;
a first torque-transmitting mechanism operatively connected to said second member of said first differential gear set and selectively engageable to connect said second member of said first differential gear set with a stationary member, thereby locking said first motor/generator at zero speed and establishing a first fixed forward speed ratio between said input member and said output member;
a second torque-transmitting mechanism operatively connected to two of said members of said first differential gear set and selectively engageable to lock said first differential gear set at a speed of said input member, thereby establishing a second fixed forward speed ratio between said input member and said output member; and
a second set of intermeshing gears including a third and a fourth intermeshing gear, said third intermeshing gear being continuously operatively interconnected with said second motor/generator and intermeshing with said fourth intermeshing gear to thereby transfer torque to said output member.

12. The electro-mechanical transmission of claim 11, further comprising:
a first set of intermeshing gears including a first and a second intermeshing gear, said first intermeshing gear being continuously interconnected with said first motor/generator for common rotation therewith, said second intermeshing gear being continuously operatively connected with said second member of said first planetary gear set for common rotation therewith and continuously intermeshing with said first intermeshing gear.

13. The electro-mechanical transmission of claim 11, further comprising:
an intermediate shaft operatively connected with said output member;
said third member of said first differential gear set and said second motor/generator being connected to said intermediate shaft for common rotation therewith.

14. The electro-mechanical transmission of claim 11, wherein said input member and said output member are aligned to form a common axis of rotation and wherein both said first and second motor/generators are concentrically disposed about said common axis of rotation.

15. The electro-mechanical transmission of claim 11, wherein said input member and said second motor/generator are aligned to rotate about a first axis of rotation; said electro-mechanical transmission further comprising:
a first countershaft offset from said first axis of rotation; wherein said first motor/generator rotates about said first countershaft.

16. An electro-mechanical transmission comprising:
an input member to receive power from an engine;
an output member;
first and second motor/generators;
a first planetary gear set having:
a ring gear member;
a sun gear member circumscribed by said ring gear member; and
a carrier member rotatably supporting a plurality of pinion gear members that meshingly engage both said ring gear member and said sun gear member;
said input member being continuously operatively connected to said carrier member, said first motor/generator being continuously operatively connected to said ring gear member, said sun gear member being continuously operatively connected to said second motor/generator and to said output member;
a first torque-transmitting mechanism operatively connected to said ring gear member and selectively engageable to connect said ring gear member to a stationary member, thereby establishing a first fixed speed ratio between said input member and said output member; and
a second torque-transmitting mechanism selectively engageable to interconnect two of said sun gear member, said ring gear member and said carrier member, thereby establishing a second fixed speed ratio between said input member and said output member; wherein said transmission is operable in only one mode providing a continuously variable range of speed ratios.

* * * * *